Jan. 26, 1965  W. J. SACKETT  3,167,173
BULK UNLOADER
Filed Oct. 16, 1962  4 Sheets-Sheet 2

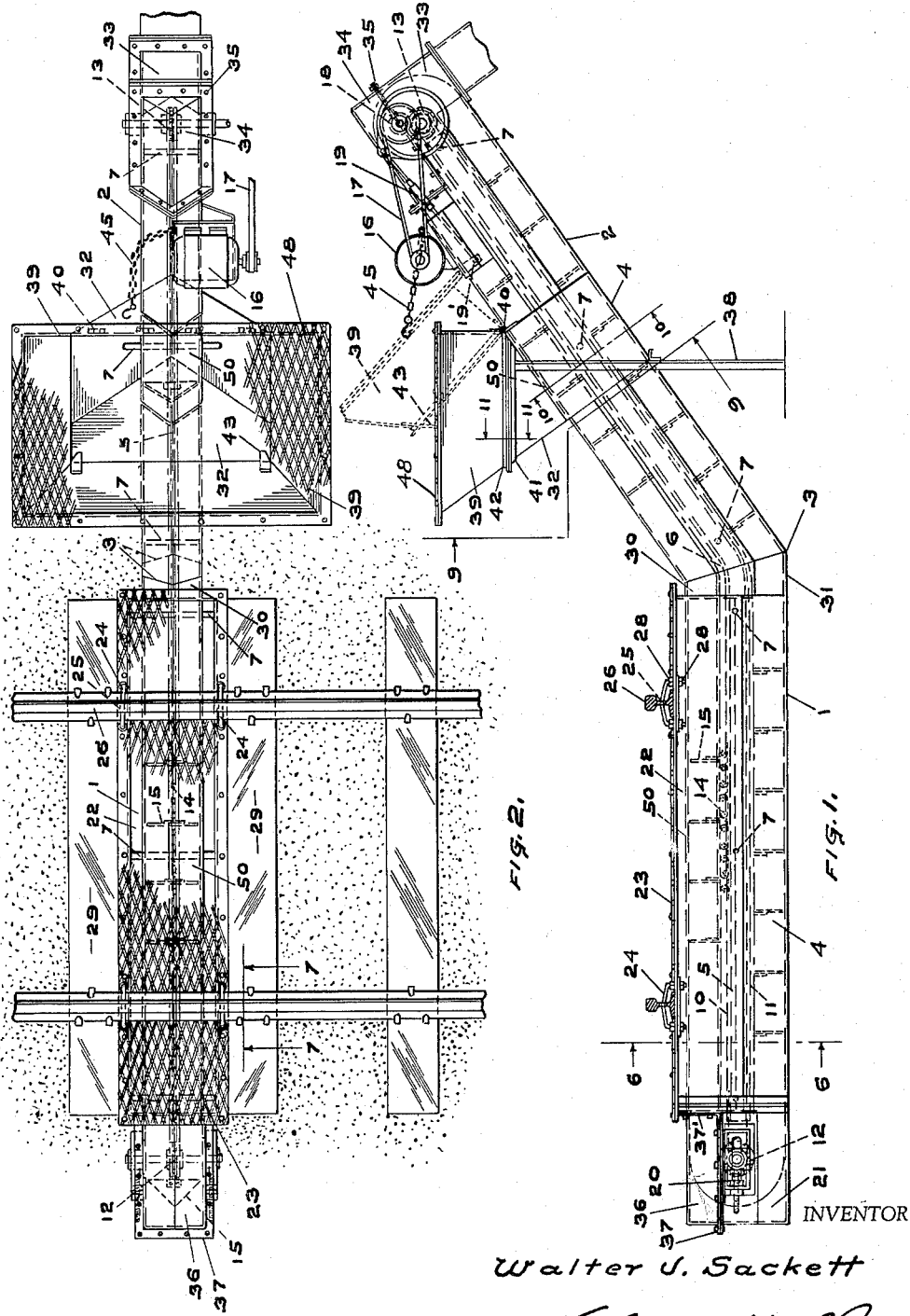

INVENTOR
Walter J. Sackett
BY Thomas W. J. Clark
ATTORNEY

Jan. 26, 1965  W. J. SACKETT  3,167,173
BULK UNLOADER

Filed Oct. 16, 1962  4 Sheets-Sheet 3

INVENTOR
Walter J. Sackett
BY Thomas W. J. Clark
ATTORNEY

Jan. 26, 1965 W. J. SACKETT 3,167,173
BULK UNLOADER

Filed Oct. 16, 1962 4 Sheets-Sheet 4

INVENTOR
Walter J. Sackett
BY
ATTORNEY

United States Patent Office 3,167,173
Patented Jan. 26, 1965

3,167,173
BULK UNLOADER
Walter J. Sackett, Baltimore, Md., assignor to The A. J. Sackett & Sons Company, Baltimore, Md., a corporation of Maryland
Filed Oct. 16, 1962, Ser. No. 230,869
4 Claims. (Cl. 198—53)

This invention relates to an improvement in a bulk material unloader. Bulk material is generally transported in railroad box cars or in hopper-bottom cars. These cars are generally taken to a siding for unloading for future storing or use of the material. The present invention relates to an improvement in an unloader designed to fit between the ties as ordinarily spaced to support the rails for these railroad cars carrying the material. The unloader is preferably of the flight conveyor type fitting between the ties and attached to the rails and it has in its course an angle to elevate the material for future handling.

Among the objects of the invention are to build such a conveyor economically and simply and which will not get out or order or require repair.

Another object of the invention is to make the conveyor unloader of such narrow construction that it will fit between the spacing of the ties supporting the track as ordinarily practiced.

Another object of the invention is to make the unloader relatively shallow so that a deep pit will not be required for its placement under the tracks.

Another object of the invention is to cover the hopper with a screen so that large portions which might otherwise injure the conveyor will be excluded.

Another object of the invention is to equip the unloader with hoppers which may be used alternately, one being used to unload a hopper car which has narrow outlets and the other one of which may be used when a bulk material is received in a box car and is shoveled from that car into an elevated hopper which carries the material to the same destination as though it had been received from a hopper-bottom car.

Other objects and advantages of the invention will be apparent from the following description and the accompanying drawings forming a part hereof and in which:

FIGURE 1 is a side elevational view of the unloader of this invention.

FIGURE 2 is a top plan view thereof.

In the drawings similar numerals refer to similar parts throughout the several views.

Figure 9:
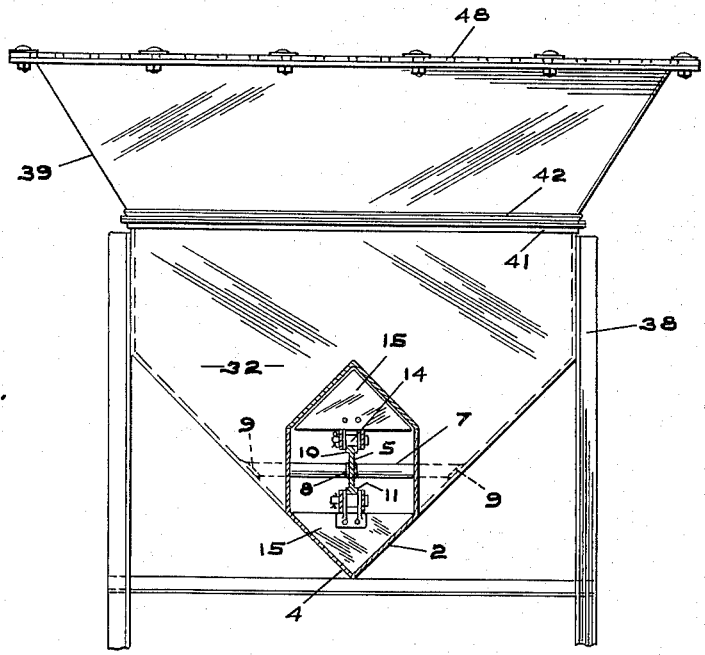
FIGURE 9 is a transverse partial sectional view on line 9—9 of FIGURE 1.
Figure 11:
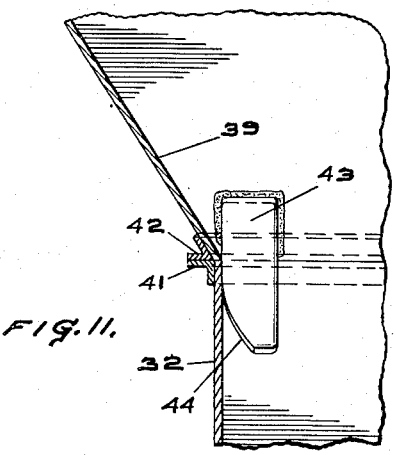
FIGURE 11 is a fragmentary sectional view on line 11—11 of FIGURE 1.
Figure 3:
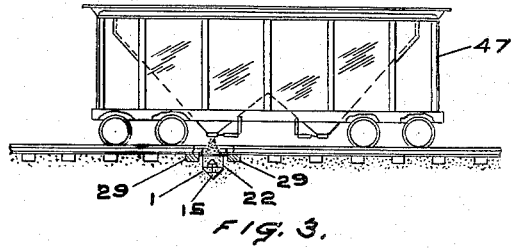
FIGURE 3 is a side elevational view of a hopper-bottom car discharging to the unloader of this invention.
Figure 10:
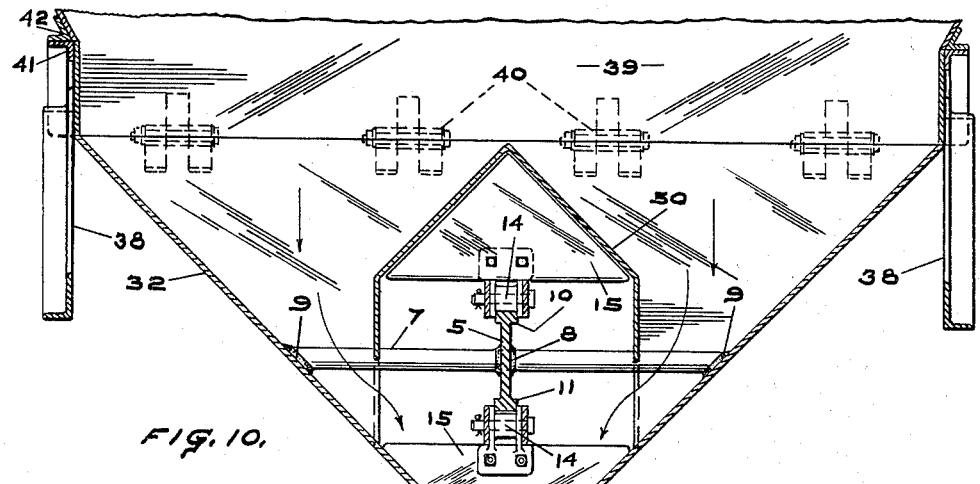
FIGURE 10 is a transverse sectional view on line 10—10 of FIGURE 1.
Figure 4:
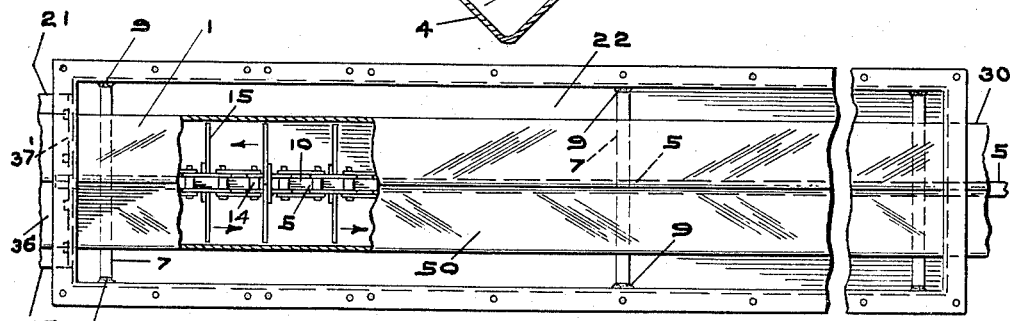
FIGURE 4 is a fragmentary top plan view with parts broken away of the unloader receiving hopper.
Figure 6:
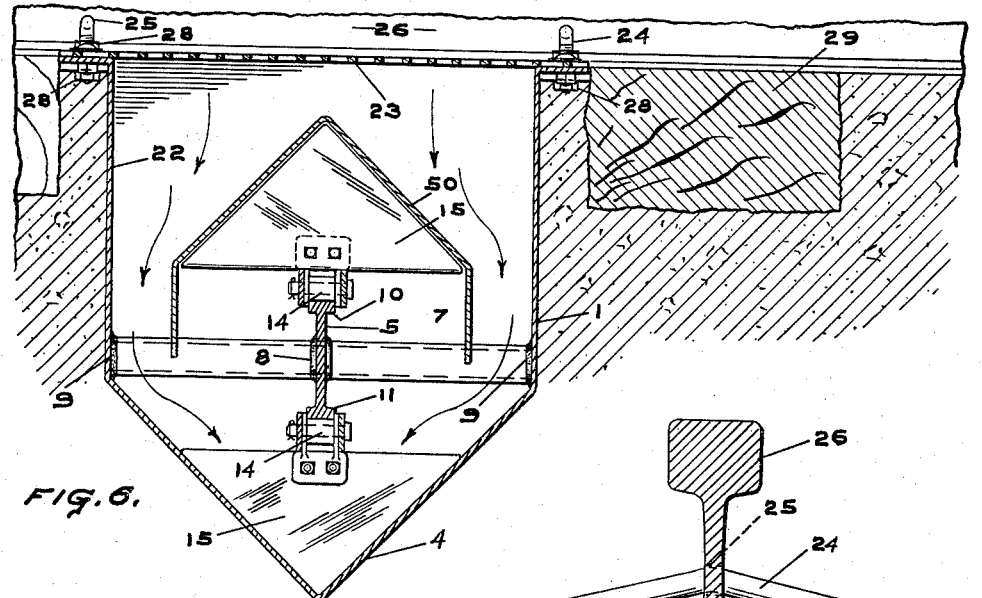
FIGURE 6 is a vertical cross-sectional view on line 6—6 of FIGURE 1.
Figure 7:
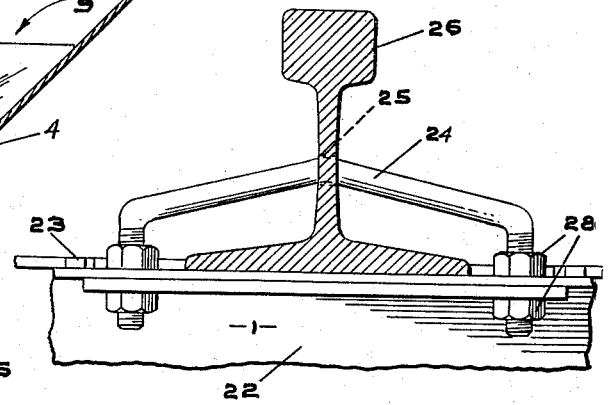
FIGURE 7 is a vertical cross-sectional view on line 7—7 of FIGURE 2.

The unloader of this invention comprises a sheet metal housing with a horizontal section 1 and an elevated or angled section 2, connected by welding or bolted flange at the angle 3. The housing is generally tubular with a V shaped bottom as shown at 4 so that material discharged into it tends to slide to the lowest portion of the housing. A vertically extending guide 5 is bent in the angle 6 to conform to the shape of the angle of the housing and this guide has tubular bars 7 passing therethrough which are welded thereto as shown at 8 and the ends of which are welded to the sides of the housing as shown at 9. The vertical guide 5 has on its upper and lower edges rails 10 and 11 and in the ends of the housing are sprockets 12 and 13 and riding on the sprockets and these rails is the conveyor 14 carrying flights 15 extending vertically in the horizontal run of the conveyor. These flights on the lower rail 11 of the guide conform at their lower edges to substantially the configuration of the bottom of the housing as shown in FIGURES 6, 9, 10, and by the movement of the conveyor push the material along the housing.

The conveyor is driven by a motor 16 connected by belt 17 to reduction gear 18 and the reduction gear is held in place by the stay bar 19 supported at its other end by bracket 19' on the housing. The conveyor at the other end is supported on sprocket 12 and has adjustable take up mechanisms 20 in the end of the housing.

Figure 5:
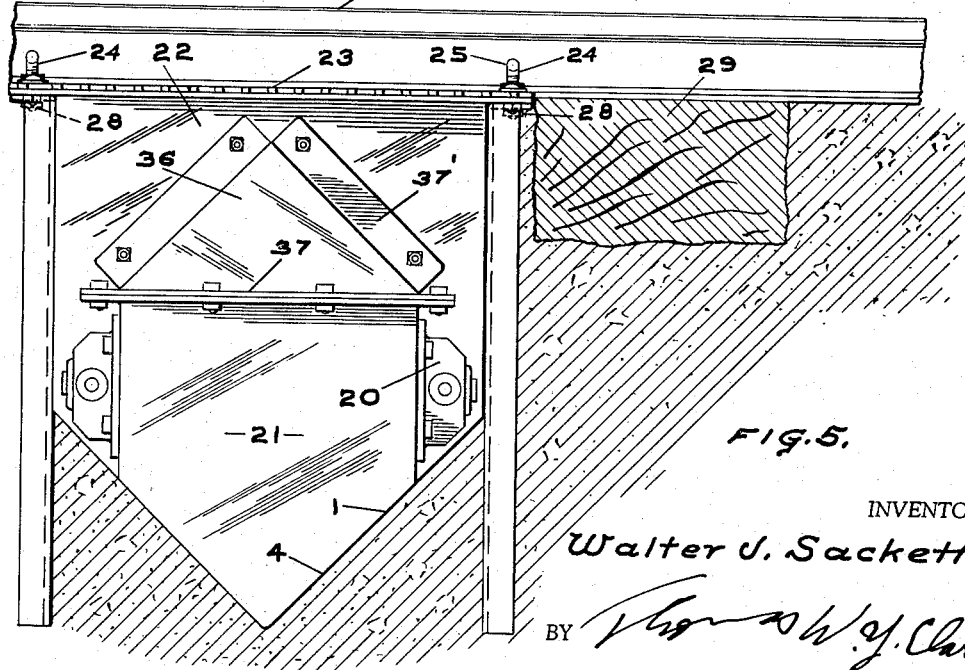
FIGURE 5 is an end elevational view of the unloader in position under the rail.

The housing is made up of the end section 21 supporting the sprocket 12 and take up mechanism 20, then the central horizontal portion 22 comprises the main hopper which is open at the top and covered by the screen 23 to screen out materials that would be too large for movement by the conveyor. The top of the hopper 22 has inverted U bolts 24 which pass through openings 25 drilled through the rails 26 of the railroad track and by means of nuts 28 hold the hopper and unloader firmly in place beneath the rails where it is placed between the ties 29 as best shown in FIGURES 2, 5 and 6. The hopper is firmly welded to the bottom of the end section 21 and to the inverted V shaped top 30 of the housing as well as the bottom of the housing 31 of the horizontal section 1, as shown in FIGURE 1. The housing then continues through the bend as shown at 3 up to the auxiliary hopper 32, the sides of which are welded to the continuing sections of the housing and the upper end section of the housing has welded thereto a discharge 33, the conveyor sprocket 13 is held in the housing and the gear reducing mechanism is held by the shaft of sprocket 13 in the housing and by the stay bar 19.

The top 34 of the discharge and upper end of the housing is held in place, and is removable, by bolts passing through the flanges 35 on the adjoining sectons. Likewise the upper part 36 on housing end 21 may be removed and is held in place by bolts on adjoining flange sections 37. This part 36 is also connected by bolts through flanges 37' and the end of hopper 22.

Figure 8:
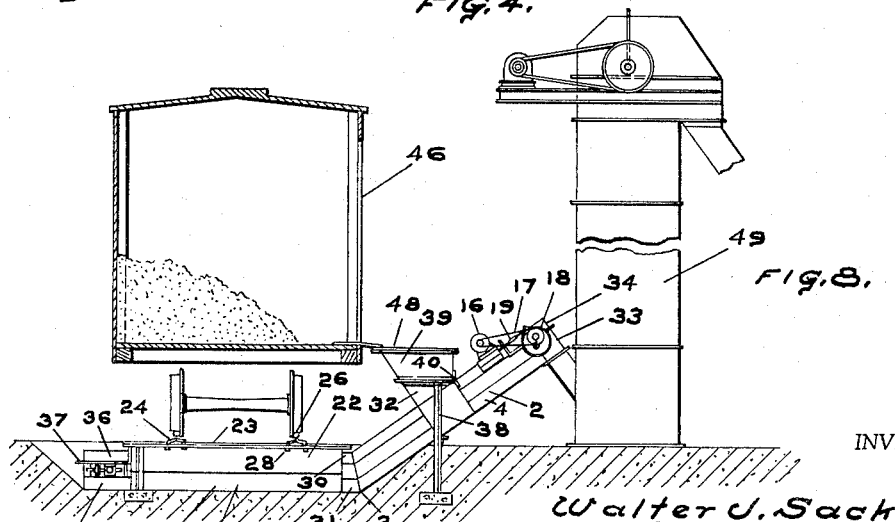
FIGURE 8 is a side elevational view of the unloader connected with a receiving elevator together with a fragmentary sectional view of a box car in position for unloading.

The auxiliary hopper 32, which is rigid with the angled section of the housing 2 is supported by the uprights 38 which also support the angled section of the housing. The auxiliary hopper 32 has an upper section 39 hinged at 40 to the back of the hopper and between the two sections of the auxiliary housing 32 and 39 are angular members 41 and 42 to reinforce the adjoining edges of the respective hopper sections. Welded to the forward edge of the upper section 39 are prongs 43 which are curved at their lower ends as shown at 44 to guide the upper section of the auxiliary hopper into registry with the lower section after the upper section has been raised and again lowered. The upper section may be held in its pivotal up position by a chain 45. The auxiliary hopper is shown in its intended use in FIGURE 8, to receive material from the close box car 46, but to give better clearance for the switching of both types of cars, the upper section 39 of the hopper is held back as shown in dotted lines in FIGURE 1, where of course it may remain when unloading the hopper-bottom car 47. The upper section of the auxiliary hopper has thereon a screen 48 similar to the screen 23. The unloader may deliver at its discharge end to an elevator conveyor 49 which could deliver to storage bins or to carriers as might be desired.

Both hoppers have extending thorugh their length a shield 50 which is supported on the bar members 7 and which is shaped like and inverted V corresponding to the shape of the flights of the conveyor and which terminate well above the lower run of the conveyor guided by the lower rail 11 on guide 5 so that material dropped into the respective hoppers falls on the shields and is diverted to the sides around the upper run of the conveyor and between the flights of the lower run of the conveyor to the V shaped bottom of the housing where the material is pushed along by the flights and elevated to the discharge of the angled portion of the housing. These shields may also be welded at their ends to the respective hoppers.

It will be apparent from the preceding detailed decription and the accompanying drawings that many modifications may be made in the most simple construction described without departing from the invention as defined in the following claims.

What is claimed as new and is desired to be secured by Letters Patent is:

1. A bulk material unloader comprising an angled housing having a substantially V shaped bottom cross-section, and having a lower horizontal portion to extend beneath a material carrier and a sloping portion angularly connected to the horizontal portion and with a discharge on the sloping portion to extend above a receiver therefrom, a vertically extending guide having upper and lower rails thereon supported by and extending centrally within the housing, sprockets at each end of the guides mounted in the housing, an endless conveyor with flights extending around said sprockets and guided by the upper and lower rails of said guide, the flights substantially conforming to the configuration of the bottom of the housing to move material therealong, an upwardly opening hopper above the horizontal portion of the conveyor, a shield supported by and extending centrally of the hopper, above the conveyor in the housing, spaced from the housing sides and vertically terminating short of the flights of the conveyor on the lower rail, to pass material from the hopper to the housing bottom between the last named conveyor flights, to be propelled thereby from the housing horizontal portion to the discharge of the sloping portion.

2. The unloader of claim 1 including means adjacent the discharge of the sloping portion of the housing to drive the conveyor.

3. The unloader of claim 1 including an auxilary hopper on the slopping portion of the housing through which material may be passed to the conveyor.

4. The unloader of claim 1 including an auxiliary hopper on the sloping portion of the housing through which material may be passed to the conveyor, the auxiliary hopper having a lower section integral with the housing and a top section hingedly connected to the lower section and prongs on one of said hopper sections on the side thereof opposite the hinged connection, to guide the two sections into alignment when swung together.

References Cited in the file of this patent
UNITED STATES PATENTS
2,380,264    Richardson _____ July 10, 1945